(12) United States Patent
Lambert

(10) Patent No.: US 9,014,682 B1
(45) Date of Patent: *Apr. 21, 2015

(54) METHOD AND SYSTEM FOR RETAINING SYNCHRONIZATION ACROSS MULTIPLE WIRELESS DEVICES DURING EXTENDED POWER SAVING INTERVALS

(71) Applicant: Marvell International Ltd., Hamilton (BM)

(72) Inventor: Paul A. Lambert, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/188,116

(22) Filed: Feb. 24, 2014

Related U.S. Application Data

(63) Continuation of application No. 13/490,182, filed on Jun. 6, 2012, now Pat. No. 8,660,548.

(60) Provisional application No. 61/496,245, filed on Jun. 13, 2011.

(51) Int. Cl.
*H04M 3/00* (2006.01)
*H04W 56/00* (2009.01)
*H04W 52/02* (2009.01)

(52) U.S. Cl.
CPC .......... *H04W 56/00* (2013.01); *H04W 52/0225* (2013.01)

(58) Field of Classification Search
CPC .. H04W 88/06; H04W 56/00; H04W 56/0015
USPC ........................................................ 455/418
See application file for complete search history.

(56) References Cited

U.S. PATENT DOCUMENTS

| 6,914,949 B2 | 7/2005 | Richards et al. |
| 7,522,639 B1 | 4/2009 | Katz |
| 7,809,012 B2 | 10/2010 | Ruuska et al. |
| 8,000,719 B1 | 8/2011 | Lambert |
| 8,340,706 B2 | 12/2012 | Zetterman et al. |

(Continued)

OTHER PUBLICATIONS

IEEE Standard for Local and metropolitan area networks Part 16: Air Interface for Broadband Wireless Access Systems; Copyright © 2009 by the Institute of Electrical and Electronics Engineers, Inc.; May 20, 2009; 2,082 pages.

(Continued)

*Primary Examiner* — Nathan Mitchell

(57) ABSTRACT

A wireless device includes a wireless local area network (WLAN) transceiver configured to (i) selectively transition between operating in a power save mode and operating in a full power mode, and (ii) while operating in the full power mode, wirelessly communicate with a second wireless device. The wireless device also includes a mobile phone radio transceiver configured to receive, in accordance with a mobile phone protocol, time information from a first base station. The time information is based on a time reference maintained by the first base station. The wireless device also includes a controller configured to instruct the WLAN transceiver to transition to the full power mode upon expiration of a sleep period. The controller determines the expiration of the sleep period based on (i) the time information and (ii) an offset between the time reference and a second time reference maintained by a second base station.

21 Claims, 8 Drawing Sheets

(56) References Cited

U.S. PATENT DOCUMENTS

| | | |
|---|---|---|
| 8,548,517 B2 | 10/2013 | Olsson et al. |
| 2003/0083095 A1 | 5/2003 | Liang |
| 2003/0096624 A1* | 5/2003 | Ormson .................. 455/456 |
| 2003/0125019 A1 | 7/2003 | Bajikar |
| 2003/0233383 A1* | 12/2003 | Koskimies ............... 707/204 |
| 2005/0043046 A1 | 2/2005 | Lee |
| 2006/0194540 A1 | 8/2006 | Hunzinger et al. |
| 2008/0159233 A1 | 7/2008 | Achtari et al. |
| 2008/0240005 A1 | 10/2008 | Hoffman et al. |
| 2009/0291701 A1 | 11/2009 | Zetterman et al. |
| 2010/0316025 A1 | 12/2010 | Brandt et al. |
| 2012/0082070 A1 | 4/2012 | Hart et al. |
| 2012/0082077 A1 | 4/2012 | Zhang et al. |
| 2012/0246265 A1* | 9/2012 | Bajko .................... 709/217 |
| 2013/0095831 A1 | 4/2013 | Lee et al. |
| 2013/0196673 A1 | 8/2013 | Smadi et al. |

OTHER PUBLICATIONS

IEEE Standard for Local and metropolitan area networks Part 20: Air Interface for Mobile Broadband Wireless Access Systems Supporting Vehicular Mobility-Physical and Media Access Control Layer Specification; Copyright © 2008 by the Institute of Electrical and Electronics Engineers, Inc.; Aug. 29, 2008; 1,053 pages.

IEEE Standard for Information technology—Telecommunications and information exchange between systems Local and metropolitan area networks—Specific requirements Part 11: Wireless LAN Medium Access Control (MAC) and Physical Layer (PHY) Specifications; Copyright © 2012 by The Institute of Electrical and Electronics Engineers, Inc.; Mar. 29, 2012; 2,793 pages.

* cited by examiner

METHOD AND SYSTEM FOR RETAINING SYNCHRONIZATION ACROSS MULTIPLE WIRELESS DEVICES DURING EXTENDED POWER SAVING INTERVALS

CROSS-REFERENCE TO RELATED APPLICATIONS

This is a continuation of U.S. patent application Ser. No. 13/490,182, filed on Jun. 6, 2012, which claims the benefit of U.S. Provisional Application No. 61/496,245, filed on Jun. 13, 2011. The entire disclosures of the applications referenced above are incorporated herein by reference.

FIELD

The present disclosure relates to a multi-radio time base, and more particularly to a device incorporating multiple radios and using a time base obtained from a first radio to control a second radio.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

IEEE 802.11-2012, IEEE 802.16-2009, and IEEE 802.20-2008, which are hereby incorporated by reference in their entirety, define operation and implementation of wireless networks including wireless local area networks (WLANs). These standards define modes of operation for WLANs, including ad-hoc and infrastructure.

FIG. 1 illustrates a functional block diagram of an ad-hoc wireless network 100. The ad-hoc wireless network 100 includes three wireless client stations 104-1, 104-2, and 104-3 (collectively, client stations 104), although ad-hoc networks with two or more client stations are possible. The client stations 104 together form a basic service set (BSS), identified by a BSS identifier (BSSID). In an ad-hoc network, such as the ad-hoc wireless network 100, the client stations 104 communicate directly with each other as indicated by the arrows in FIG. 1.

A beacon is periodically transmitted by the client stations 104. The beacon includes a timestamp used for synchronization, a beacon interval, and capability information—such as supported transfer rates. After transmission of the beacon, there is an announcement traffic indication message (ATIM) window, and a length of the ATIM window is indicated by the beacon. During an ATIM window, a first client station 104 can notify a second client station 104 that the first client station 104 has buffered traffic ready to be sent to the second client station 104.

A beacon interval specifies an amount of time before a next beacon will be transmitted. Based upon the beacon interval, client stations 104 can operate in a low power mode until the next beacon is expected. During low power mode, a client station 104 may power down components, such as transceivers, and/or otherwise alter operation to conserve power.

A client station 104 may not be able to transmit or receive data while in low power mode. Therefore, a client station 104 resumes normal operation in order to receive a beacon, and will remain awake during an ATIM window. If a client station 104 receives or transmits based on a notification received during an ATIM window of a beacon interval, the client station 104 will stay awake for a remainder of the beacon interval.

FIG. 2 illustrates a functional block diagram of an infrastructure mode wireless network 150. The infrastructure mode wireless network 150 includes three client stations 154-1, 154-2, and 154-3 (collectively, client stations 154), which all communicate with a common device, access point (AP) 156.

The client stations 154 and the AP 156 together form a BSS. In various implementations, the BSSID corresponds to the MAC address of the AP 156. The AP 156 serves as an intermediary for communications between the client stations 154. The AP 156 may also communicate with a wired network 158, which in turn may communicate with other BSS's (not shown) or other networks, such as the Internet 160.

The AP 156 periodically transmits a beacon to the client stations 154 within the BSS. The beacon is a packet or frame of information that informs the client stations 154 about the capabilities of the BSS, and coordinates communication within the BSS. The beacon includes the BSSID, the beacon interval, and a delivery traffic indication message (DTIM). The DTIM serves a function similar to the ATIM of an ad-hoc network.

SUMMARY

A method including selectively operating a wireless local area network (WLAN) module of a first wireless device in a power save mode. The method includes, while not operating the WLAN module in the power save mode, communicating wirelessly with a second wireless device using the WLAN module. The method includes receiving, in accordance with a mobile phone protocol, base station time reference information from a base station. The method includes maintaining, at least while operating the WLAN module in the power save mode, a base station time reference based on the base station time reference information received in accordance with the mobile phone protocol. The method includes controlling, based on the maintained base station time reference, when the WLAN module exits the power save mode to permit the WLAN module to communicate with the second wireless device.

A first wireless device including a wireless local area network (WLAN) module, a mobile phone radio module, a time module, and a sleep module. The wireless local area network (WLAN) module is configured to selectively operate in a power save mode. While not operating in the power save mode, the WLAN module is configured to communicate with a second wireless device. The mobile phone radio module is configured to receive, in accordance with a mobile phone protocol, base station time reference information from a base station. The time module is configured to maintain, at least while the WLAN module is operating in the power save mode, a base station time reference based on the base station time reference information received in accordance with the mobile phone protocol. The sleep module is configured to control, based on the base station time reference maintained by the time module, when the WLAN module exits the power save mode to permit the WLAN module to communicate with the second wireless device.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
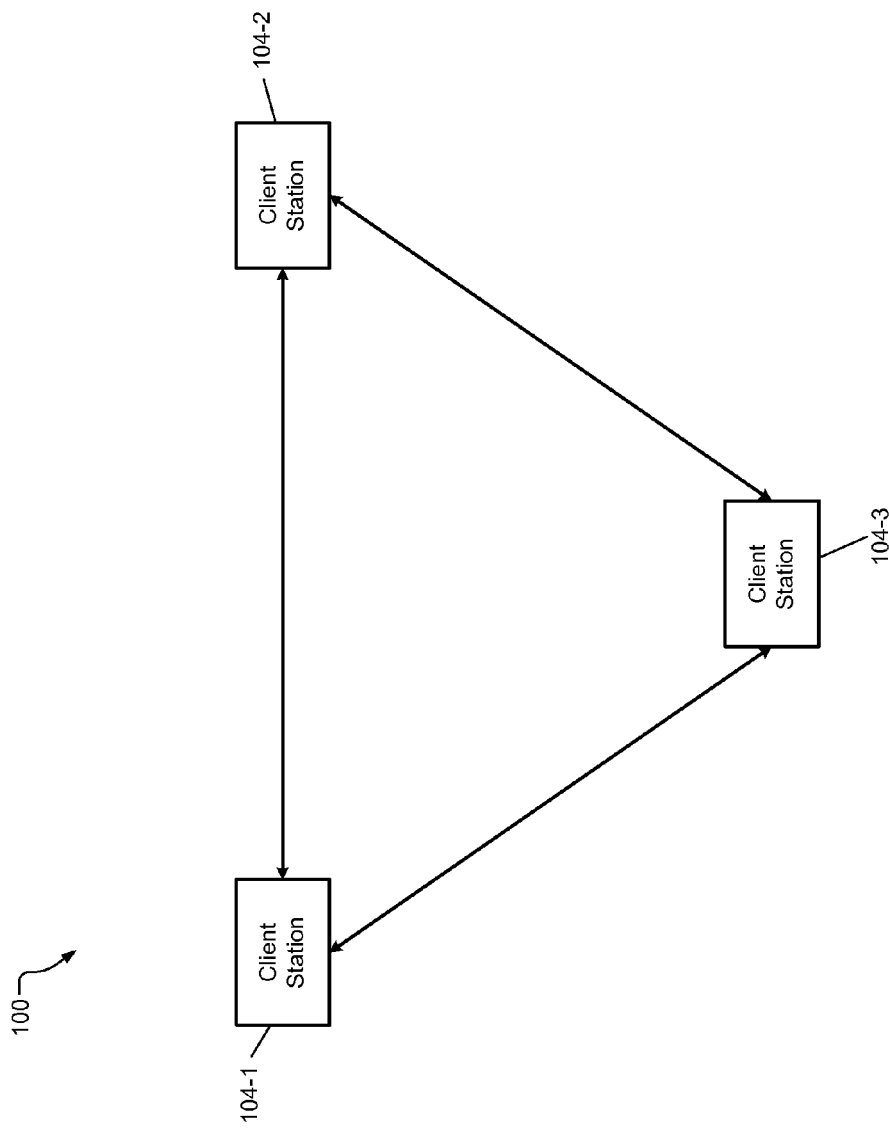
FIG. 1 is a functional block diagram of an ad-hoc wireless network according to the prior art.
Figure 2:
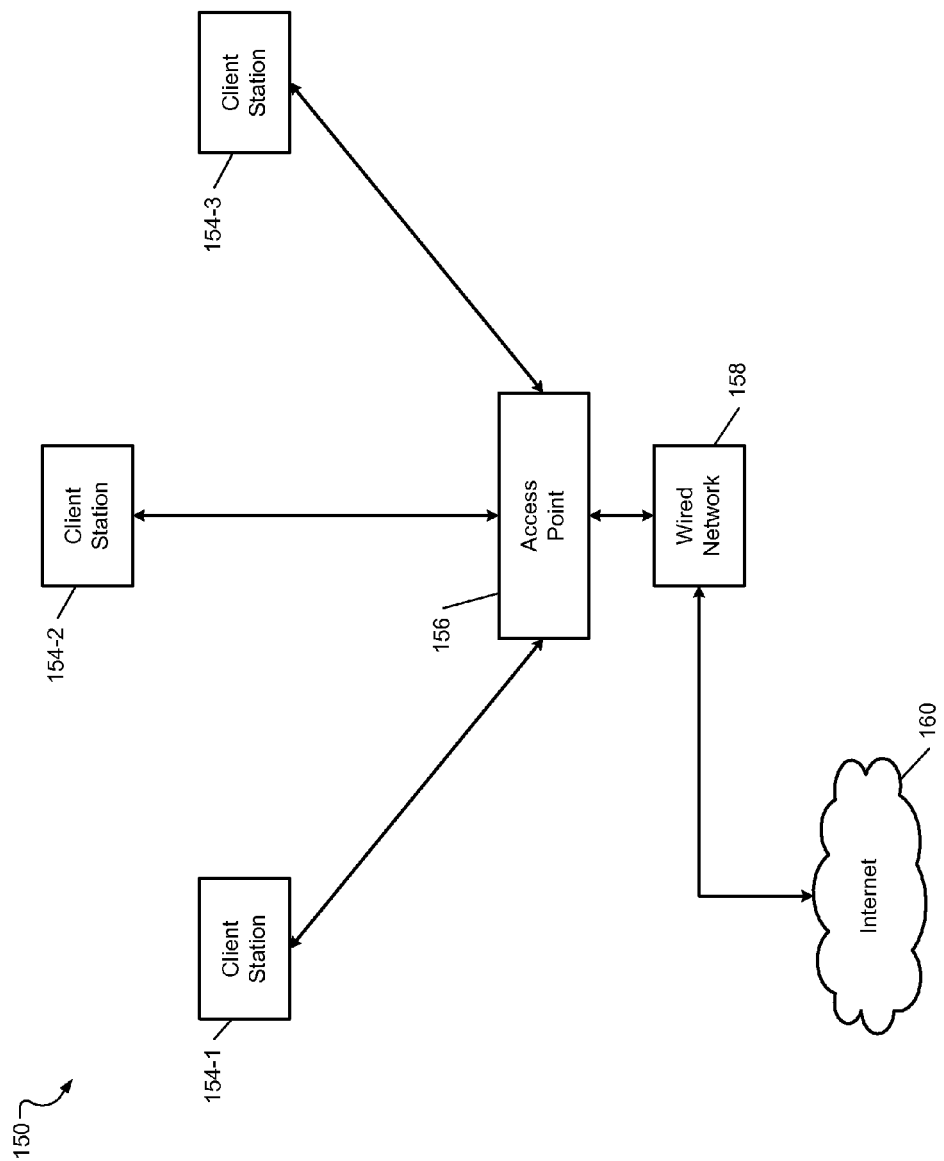
FIG. 2 is a functional block diagram of an infrastructure mode wireless network according to the prior art.

Wireless devices (also referred to generally as "devices" herein) communicating with each other within a wireless local area network (WLAN) may agree to enter a low power mode (referred to as a "sleep mode") for a period of time (i.e., a "sleep period"), and then awake from the sleep mode to resume operation and exchange any data that has been queued during the sleep period. This agreement may be coordinated using beacons; and the sleep period may be specified by (or be based on) a beacon interval.

For devices running applications in which a higher latency is acceptable, the sleep periods can be extended, thereby saving power. Such higher latency functioning may be acceptable for, as an example, networks of sensors, where power consumption is more important than latency. However, standard WLAN devices may have time references that are not accurate enough to support longer sleep periods, such as hours or days. For example, if first and second devices agree on a beacon interval, but the clock for the first device is slightly faster than the clock for the second device, the first and second devices may awake at different times and fail to communicate.

This problem can be mitigated by increasing a length of time that one or more devices remain awake (referred to herein as an "awake period") so that even if devices wake up at different times, there will be some overlap in awake periods of the devices. However, this has the disadvantage of decreasing the amount of time spent in sleep mode, and therefore increasing power consumption. In addition, if the beacon interval is long enough, increasing the awake period proportionally may not be practical.

While WLAN devices may not normally have highly accurate time references, other systems, such as mobile phone networks, may have more accurate time references. In one implementation, a WLAN device can use a time reference from a base station of a mobile network (hereinafter, "base station time reference") when determining when to wake up following a beacon interval.

Devices that have a mobile phone connection as well as a WLAN connection, such as smart phones, some tablet computers, and various notebook computers, may already have hardware necessary for receiving a base station time reference. Other WLAN devices may be supplemented with additional circuitry that allows reception of the base station time reference. The additional circuitry may be a subset of the circuitry that would normally be present when communicating over a mobile phone network. The additional circuitry may be powered up intermittently or periodically to receive the base station time reference and update an internal time reference of the device. In this way, a constant power drain from the additional circuitry is avoided.

For example only, see U.S. Pat. No. 8,000,719, the disclosure of which is incorporated herein by reference in its entirety, which describes a mobile network device including wireless communications modules for communication with a mobile phone network as well as a Wi-Fi network.

In order for devices to agree on a base station time reference, an autonegotiation process may be followed. The devices may determine which base stations can be accessed and whether there is a base station time reference common to the devices. If not, a set of base station time references may be selected and an offset determined between the base station time references. One of the base station time references may be selected as a master and the devices using the other base station time references can offset the other base station time references to synchronize with the master. Autonegotiation may be facilitated by user interaction to associate devices, such as using a technique similar to Wi-Fi Protected Setup. In other words, while devices are in close proximity to each other, a user may physically interact with one or more of the devices to establish an association. For example only, a button may be pressed on each of the devices within a predetermined period of time. Devices whose button was pressed within the predetermined period of time may associate with each other.

This coordination of base station time references can be done before communication begins, for example by devices that plan to communicate first agreeing on a base station time reference. For example only, the devices may communicate with a coordination manager that assigns base station time references to devices that plan to communicate with each other. In implementations where the devices are in close proximity to each other, the coordination manager may be part of an access point. Alternatively, the coordination manager may be located elsewhere.

For example only, the coordination manager may include a server or a website that the devices interface with and that coordinates base station time references. For example only, social groups established online, such as with Facebook, Google+, etc., can be used to group devices by the coordination manager. When grouped devices are associated with a common base station time reference by the coordination manager, the devices may be more easily discoverable by each other. For example only, if two devices are in communication and agree to go into a sleep mode, a third device that wishes to communicate with the two devices knows the base station time reference that is being used, which may provide information as to when the first two devices will awake from the sleep mode.

For example only, an association manager may assign certain times at which the group may wake ("wake times"). In one example of a high latency system, the association manager may assign a base station time reference and indicate that the wake times are five minutes after the start of each hour. In this way, a new device that wants to join other devices knows that using the base station time referenced, the new device can wake up at five minutes after the hour to discover the other devices. In various implementations, devices may agree to skip one or more of these wake times. In such implementations, the new device may wait for multiple periods before determining that no other discoverable devices are present. An upper limit may be imposed on the number of wake times that can be skipped so that a new device can decide whether there are other discoverable devices present within a finite period of time.

Figure 3:
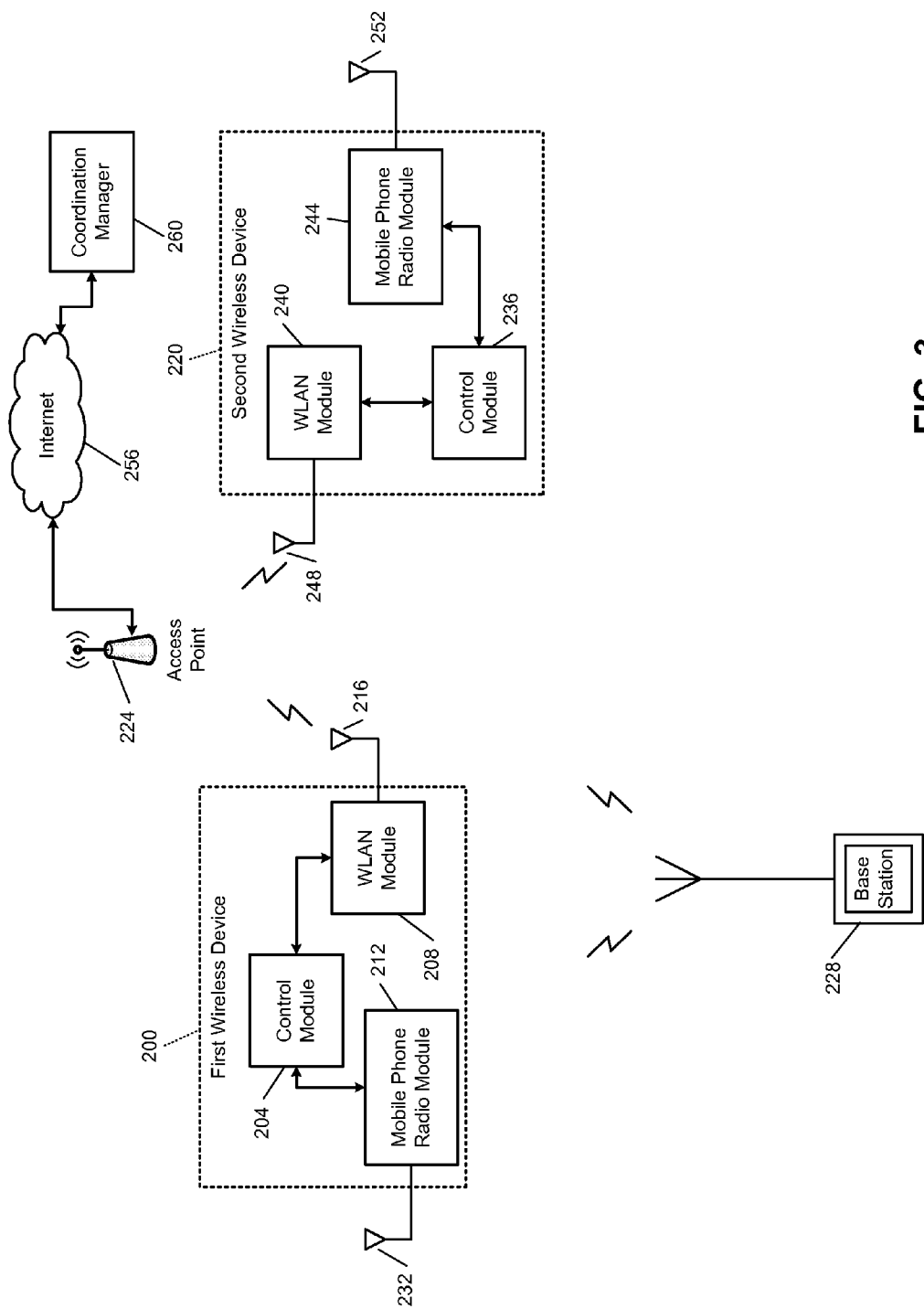
FIG. 3 is a functional block diagram of wireless devices in communication with an access point and a base station.

In FIG. 3, a first wireless device 200 includes a control module 204 that controls a WLAN module 208 and a mobile phone radio module 212. The WLAN module 208 communicates wirelessly via an antenna 216 with a second wireless device 220 and/or an access point 224. The mobile phone radio module 212 communicates with a base station 228 via an antenna 232.

The second wireless device 220 includes a control module 236 that controls a WLAN module 240 and a mobile phone radio module 244. The WLAN module 240 communicates via an antenna 248 with the first wireless device 200 and/or the access point 224. The mobile phone radio module 244 communicates, via an antenna 252, with the base station 228. In various implementations, the mobile phone radio modules 212 and 244 may be configured as receive-only devices, capable of receiving base station time reference information but not transmitting data to the base station 228.

The access point 224 may provide connectivity to the Internet 256. A coordination manager 260 may be accessible via the Internet 256. In various implementations, the coordination manager 260 may instead be co-located with the access point 224 and/or may be accessible via a local area network (not shown) through the access point 224. As discussed above, the coordination manager 260 may be absent when devices autonegotiate base station time reference information.

The WLAN modules 208 and 240 may communicate with the access point 224 for purposes of coordinating base station time reference information. In various implementations, the WLAN modules 208 and 240 may communicate with each other exclusive of the access point 224 once base station time reference information has been coordinated. The control module 204 may control when the WLAN module 208 sleeps (i.e., enters sleep mode) and wakes (i.e., exits sleep mode) based on base station time reference information from the mobile phone radio module 212. Alternatively, the control module 204 may provide base station time reference information to the WLAN module 208, and the WLAN module 208 then makes sleep and wake decisions on its own.

Figure 4B:
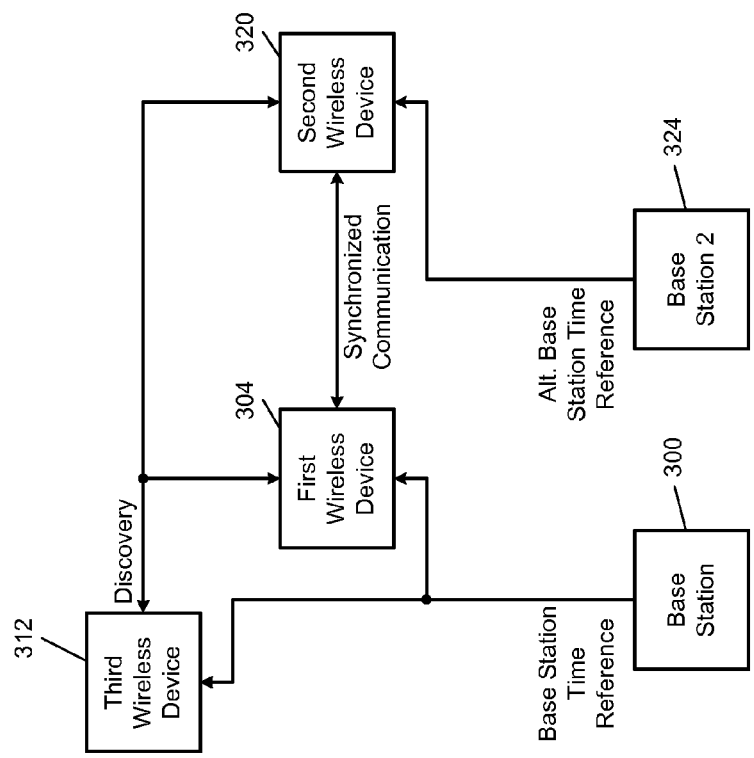
FIGS. 4A-4B are functional data flow diagrams of wireless devices receiving base station time references from base stations.
Figure 4A:
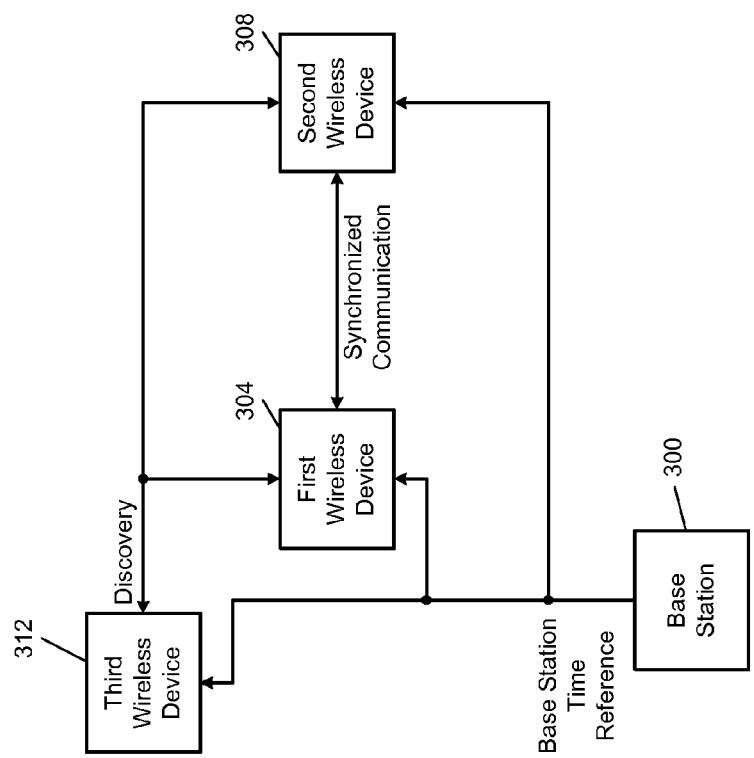

In FIG. 4A, a base station 300 provides a base station time reference to a first wireless device 304 and a second wireless device 308. Based on the base station time reference, the first wireless device 304 and the second wireless device 308 carry out synchronized communication, in which beacon intervals and associated sleep and wake periods are synchronized to the base station time reference. A third wireless device 312 also receives the base station time reference, and can therefore be discovered by the first wireless device 304 and the second wireless device 308.

In FIG. 4B, while the first wireless device 304 receives the base station time reference from the base station 300, a second wireless device 320 receives an alternate base station time reference from a second base station 324. The third wireless device 312 receives either base station time reference, and in this case is shown receiving the base station time reference from the base station 300. The second wireless device 320 may receive the alternate base station time reference because the second wireless device 320 is not compatible with the base station 300.

For example only, the base station 300 may use a different mobile phone protocol, such as GSM (Global System for Mobile Communications), than a protocol used by the second base station 324, such as CDMA (Code Division Multiple Access). The second wireless device 320 may be preprogrammed with a translation between the base station time reference and the alternate base station time reference. In various implementations, this may simply be a fixed offset between the two references. Using multiple base station time references may increase variance between the internal time references and therefore the awake period may be lengthened when using more than one base station time reference.

Figure 5:
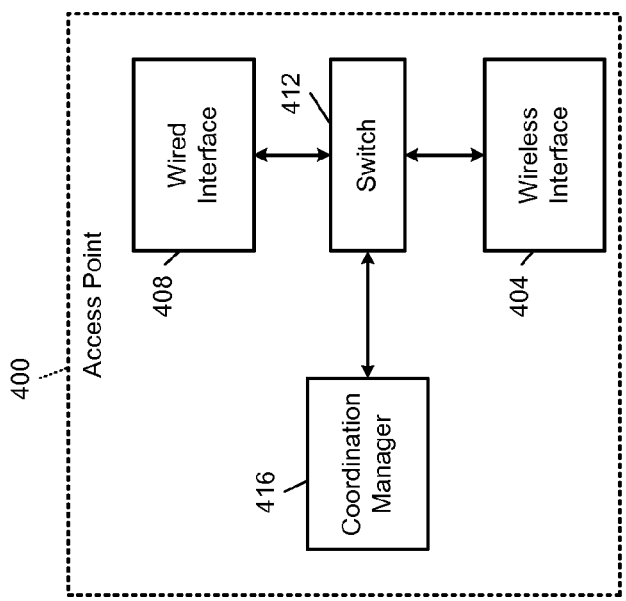
FIG. 5 is a functional block diagram of an example access point.

In FIG. 5, an example implementation of an access point 400 includes a wireless interface 404 that communicates with the WLAN and a wired interface 408 that communicates with an uplink, which may provide access to the Internet. A switch 412 passes packets between the wireless interface 404 and the wired interface 408. A coordination manager 416 may be present within the access point 400 and can coordinate base station time reference settings between devices connected wirelessly to the wireless interface 404.

Figure 6:
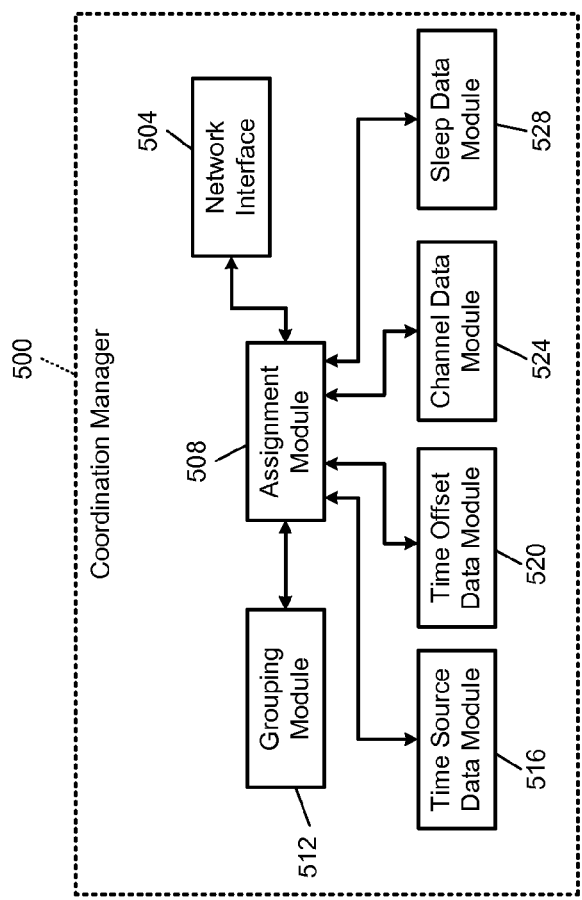
FIG. 6 is a functional block diagram of an example coordination manager.

In FIG. 6, an example implementation of a coordination manager 500 includes a network interface 504 that communicates with an assignment module 508. The assignment module 508 determines which wireless devices should be grouped together and stores that information in a grouping module 512. For example only, the grouping module 512 may already include some grouping information based on participation in social networks.

Assignment module 508 determines one or more time sources for each group in the grouping module 512 and records that information in a time source data module 516. For example, the assignment module 508 may specify a single base station time reference when all of the wireless devices can receive time information from the same mobile phone networks. Multiple base station time references can be assigned when different wireless devices have different mobile phone network capabilities.

The assignment module 508 may assign an order of preference for base station time references, with more stable and/or more widely available base station time references designated as more preferred. A group of wireless devices that are requested to communicate with each other may first attempt to communicate with each other on the most preferred base station time reference to which the entire group has access. If there is no common base station time reference, the group can devolve to using the two most preferred base station time references. This process can continue with three base station time references and then more until all the wireless devices have identified an available base station time reference.

A time offset data module 520 may specify offsets and/or other adjustment factors used when interpreting one base station time reference in light of a second base station time reference. A channel data module 524 stores data about which wireless channels the group should use—i.e., which of the predetermined frequency bands of the WLAN protocol. For example only, a primary and backup channel may be specified, where the backup is used in case of interference of the primary channel.

A sleep data module 528 stores data about sleep periods for the group, and may specify a base sleep period and also specific time offsets when the sleep period may begin or end.

For example, a base sleep period may be specified and wireless devices may sleep for either that sleep period or for integer multiples of that sleep period. To allow for discovery of other wireless devices, in addition to the length of the sleep period being specified, the beginning or ending times of the sleep periods may be specified. For example only, the sleep data module 528 may specify certain times at which sleep periods may begin (sleep times) or end (wake times). For example only, sleep periods for a certain group may be specified to end at 200 milliseconds after each second of a base station time reference. In other words, once the base station time reference indicates that a second has elapsed, 200 milliseconds later is the wake time at which the sleep period is expected to end.

Figure 7:
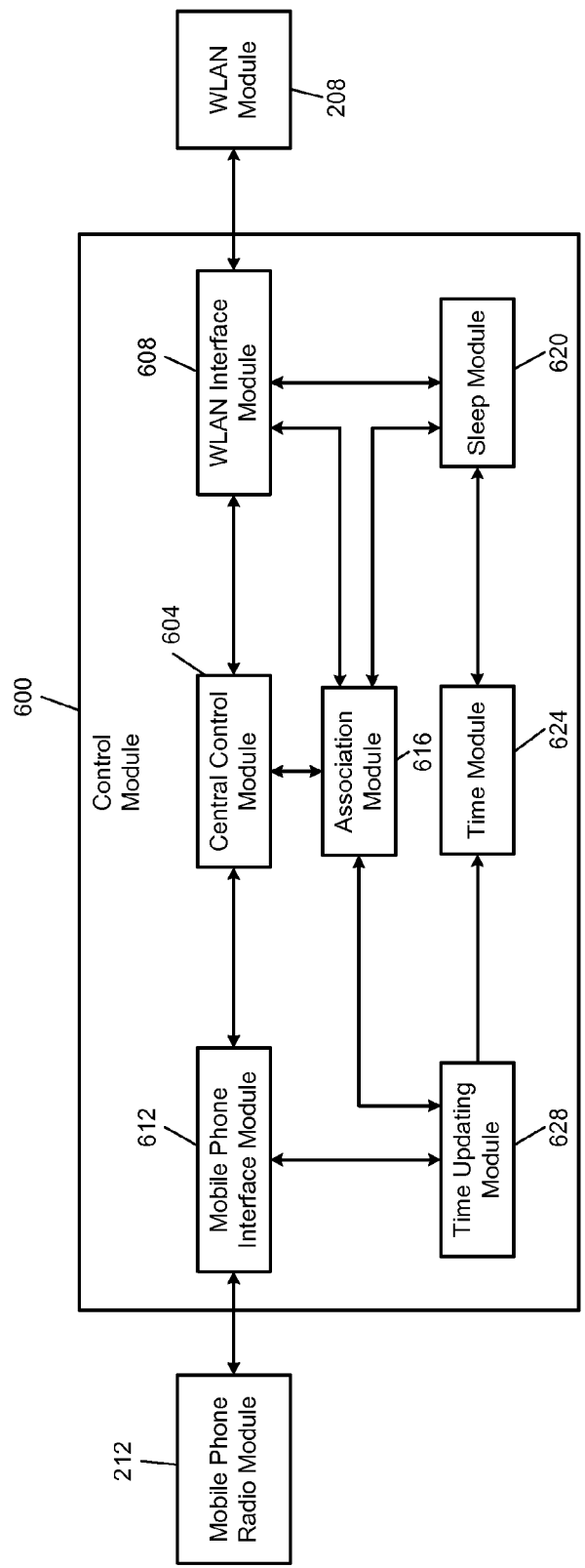
FIG. 7 is a functional block diagram of an example control module of a wireless device.

In FIG. 7, an example control module 600 includes a central control module 604 that provides data to and receives data from a WLAN interface module 608 and a mobile phone interface module 612. The central control module 604 communicates with an association module 616, which stores settings related to base station time references for the control module 600. For example only, the association module 616 may store a group identifier specifying which group the control module 600 is part of, information designating the source of base station time reference data, information for offsetting the base station time reference data with respect to other base station time references, information about which wireless channels to use by the WLAN interface module 608, and information about when and how long to sleep.

Information regarding sleep mode may be provided to a sleep module 620. The sleep module 620 controls the times at which the WLAN interface module 608 enters and/or exits the sleep mode. The sleep module 620 may receive data regarding sleep times or wake times from the WLAN interface module 608, including beacon intervals and received and transmitted beacons, as well as information regarding windows such as an announcement traffic indication message window. In sleep mode, some or all of the circuitry related to the WLAN module 208 and the WLAN interface module 608 may enter a reduced power mode. The power may be reduced partially or completely, which may include reducing a clock frequency or stopping a clock altogether.

The sleep module 620 determines timing of sleep times and wake times based on time provided by a time module 624. The time module 624 includes a clock and is periodically updated (or maintained) by a time updating module 628. The time updating module 628 may receive base station time reference information from a mobile network base station via the mobile phone interface module 612. The mobile phone interface module 612 may power up the mobile phone radio module 212 in order to receive base station time reference data. The powering up may be performed periodically or preparatory to determining a wake up time. Alternatively, the control module 600 may be used in a device where the mobile phone radio module 212 normally remains powered up to provide functionality such as telephone connectivity. In one implementation, the time module 624 maintains the base station time reference based on the base station time reference information only while the WLAN interface module 608 is operating in the power save mode.

Figure 8:
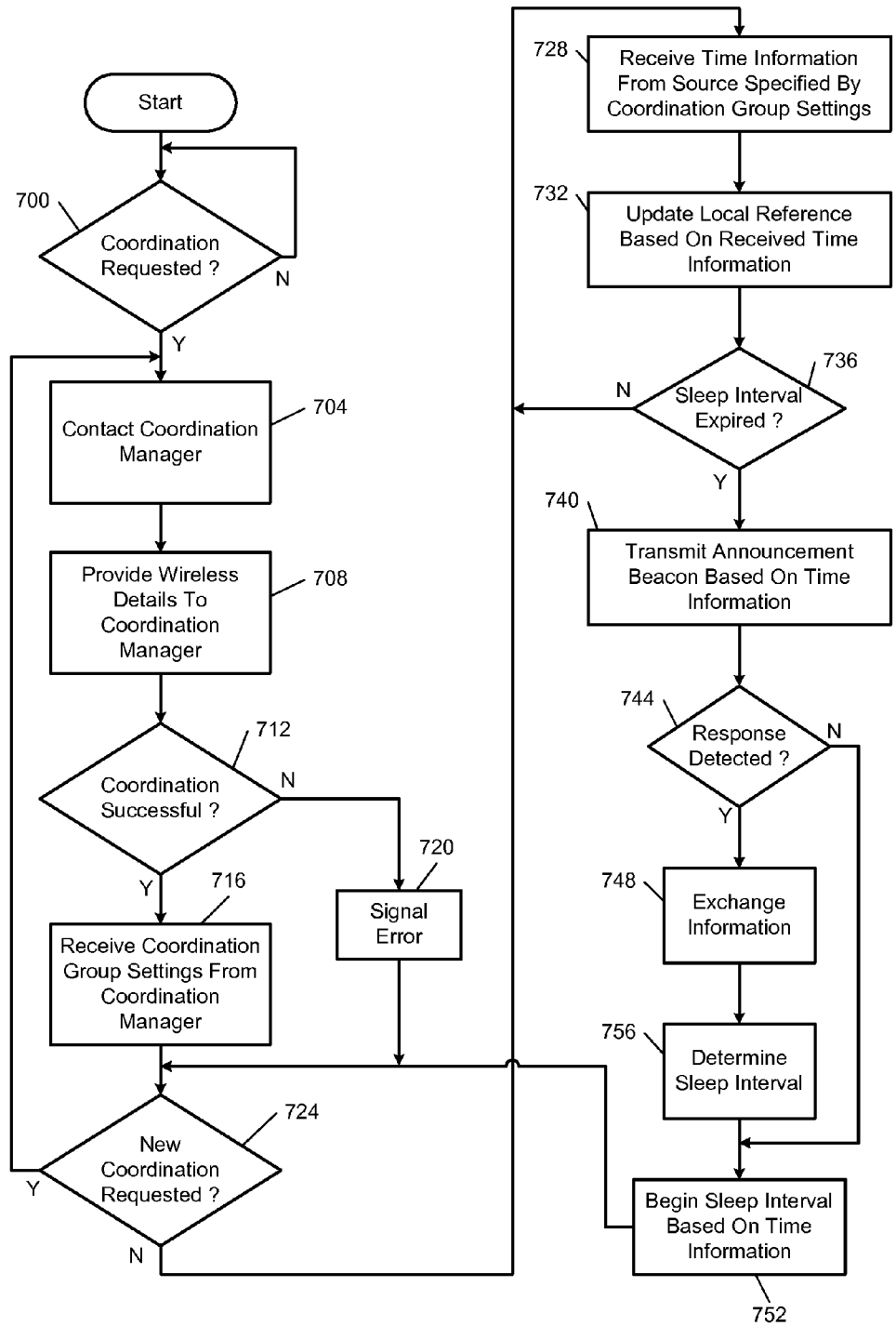
FIG. 8 is a flowchart depicting example operation of a wireless device.

In FIG. 8, example control performed by a control module is presented. Control begins at 700, where control determines whether coordination of base station time references with other devices is requested. If so, control transfers to 704; otherwise, control remains in 700. At 704, control contacts the coordination manager. Control continues at 708, where details of the wireless device are provided to the coordination manager. For example, these details may include supported frequencies and protocols of both WLAN and mobile phone networks of the wireless device.

Control continues at 712, where control determines from the coordination manager whether coordination has been successful. If so, control transfers to 716; otherwise, control transfers to 720. At 720, control signals an error and continues at 724. This error may indicate that a different coordination manager should be used or the wireless device should join a different coordination group. In addition, the error may indicate that the wireless device is not compatible with the other devices in the group; for example, there may be no common mobile phone network to which all of the wireless devices can listen for base station time reference information.

At 716, control receives coordination group settings from the coordination manager. These settings may include some or all of the settings mentioned above, such as group identifiers, sources of base station time reference, translation data between base station time references, wireless channel data, and sleep lengths and times. At 724, control determines whether a new coordination is requested. If so, control returns to 704; otherwise, control continues at 728. A new coordination may be requested when a user of the wireless device decides to communicate with a different group of wireless devices.

At 728, control receives time information from a source specified by the coordination group settings. Control continues at 732, where the base station time reference of the wireless device is updated based on the received time information. Control continues at 736, where control determines whether a current sleep period has expired. If so, control transfers to 740; otherwise, control returns to 728. If a sleep mode has not been entered, it is considered that the sleep period has expired and control will continue at 740.

At 740, control transmits an announcement beacon at a time specified by, and using wireless settings specified by, the coordination group settings. Control continues at 744, where control determines whether a response is detected. If so, control transfers to 748; otherwise, control transfers to 752. At 748, control exchanges information with the detected wireless device and continues at 756. At 756, control negotiates a sleep period with the one or more other wireless devices. Control continues at 752, where a sleep period is begun based on a base station time reference. Control then continues at 724.

Figure 9A:
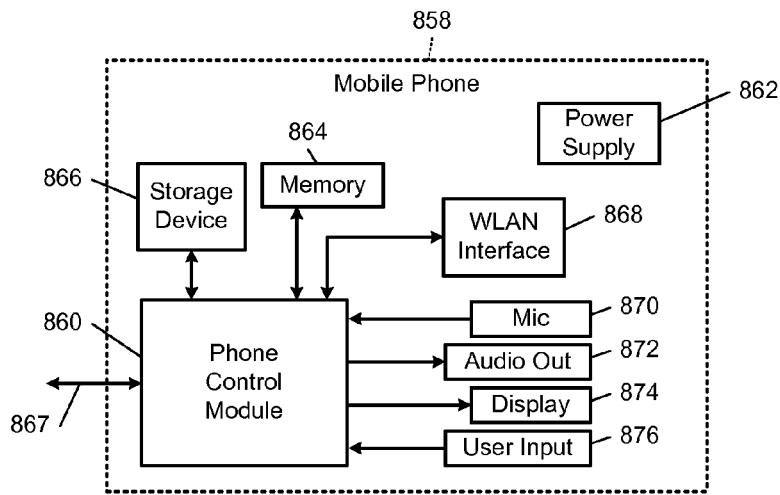
FIG. 9A is a functional block diagram of an example mobile phone.

In FIG. 9A, the teachings of the present disclosure can be implemented in a phone control module 860 of a mobile phone 858. The mobile phone 858 includes the phone control module 860, a power supply 862, memory 864, a storage device 866, and a cellular network interface 867. The mobile phone 858 may include a WLAN interface 868 and antenna (not shown), a microphone 870, an audio output 872 such as a speaker and/or output jack, a display 874, and a user input device 876 such as a keypad and/or pointing device.

The phone control module 860 may receive input signals from the cellular network interface 867, the WLAN interface 868, the microphone 870, and/or the user input device 876. The phone control module 860 may process signals, including encoding, decoding, filtering, and/or formatting, and generate output signals. The output signals may be communicated to one or more of memory 864, the storage device 866, the cellular network interface 867, the WLAN interface 868, and the audio output 872. The phone control module 860 may provide base station time reference information received via the cellular network interface 867 to the WLAN interface 868.

Memory 864 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 866 may include an optical storage drive, such as a DVD drive, and/or a hard disk drive (HDD). The power supply 862 provides power to the components of the mobile phone 858.

Figure 9B:
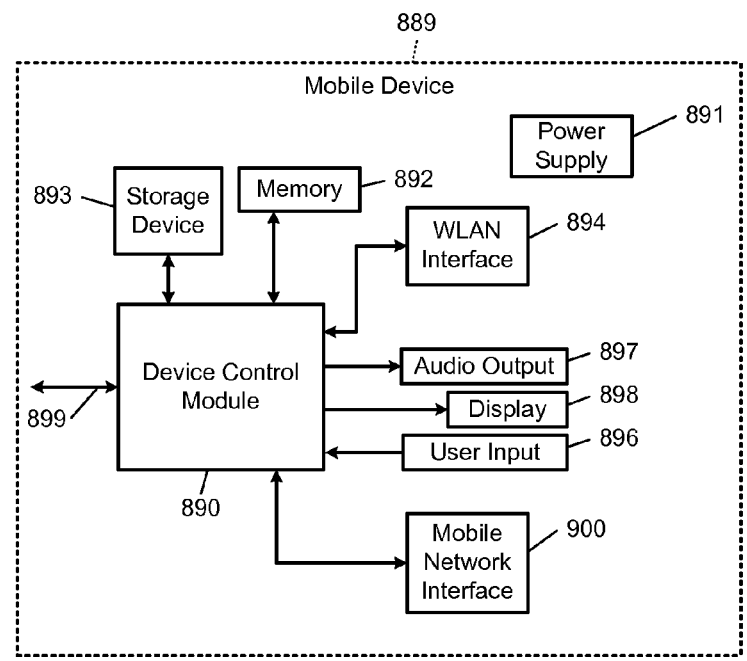
FIG. 9B is a functional block diagram of an example mobile device.

In FIG. 9B, the teachings of the disclosure can be implemented in a device control module 890 of a mobile device 889. The mobile device 889 may include the device control module 890, a power supply 891, memory 892, a storage device 893, a WLAN interface 894 and antenna (not shown), and an external interface 899.

The device control module 890 may receive input signals from the WLAN interface 894 and/or the external interface 899. The external interface 899 may include USB, infrared, and/or Ethernet. The input signals may include compressed audio and/or video, and may be compliant with the MP3 format. Additionally, the device control module 890 may receive input from a user input 896 such as a keypad, touchpad, or individual buttons. The device control module 890 may process input signals, including encoding, decoding, filtering, and/or formatting, and generate output signals.

The device control module 890 may output audio signals to an audio output 897 and video signals to a display 898. The audio output 897 may include a speaker and/or an output jack. The display 898 may present a graphical user interface, which may include menus, icons, etc. The power supply 891 provides power to the components of the mobile device 889. Memory 892 may include random access memory (RAM) and/or nonvolatile memory.

Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 893 may include an optical storage drive, such as a DVD drive, and/or a hard disk drive (HDD). The mobile device may include a personal digital assistant, a media player, a laptop computer, a gaming console, or other mobile computing device. The mobile device 889 also includes a mobile network interface 900 and antenna (not shown) that receives time information from a base station of a mobile phone network. The device control module 890 may provide the base station time reference information to the WLAN interface 894 according to the principles of the present disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A wireless device comprising:
a wireless local area network (WLAN) transceiver configured to (i) selectively transition between operating in a power save mode and operating in a full power mode, and (ii) while operating in the full power mode, wirelessly communicate with a second wireless device;
a mobile phone radio transceiver configured to receive, in accordance with a mobile phone protocol, time information from a first base station, wherein the time information is based on a time reference maintained by the first base station; and
a controller configured to (i) instruct the WLAN transceiver to transition to the full power mode upon expiration of a sleep period and (ii) determine the expiration of the sleep period based on
   (a) the time information from the first base station, and
   (b) an offset between the time reference maintained by the first base station and a second time reference maintained by a second base station.

2. The wireless device of claim 1, wherein the controller is configured to receive and store time reference settings common to a group that includes the wireless device and the second wireless device.

3. The wireless device of claim 2, wherein the controller is configured to request participation of the wireless device in the group.

4. The wireless device of claim 3, wherein the controller is configured to communicate with a coordination manager to request participation of the wireless device in the group.

5. The wireless device of claim 4, wherein the coordination manager specifies the first base station from which the mobile phone radio transceiver is to receive the time information.

6. The wireless device of claim 4, wherein the coordination manager specifies a wireless channel for the WLAN transceiver to use in communicating with the second wireless device.

7. The wireless device of claim 4, wherein the coordination manager specifies the offset between the time reference maintained by the first base station and the second time reference maintained by the second base station.

8. The wireless device of claim 4, wherein the controller is configured to communicate with the coordination manager using the WLAN transceiver.

9. The wireless device of claim 8, wherein the controller is configured to communicate with the coordination manager, using the WLAN transceiver, via a WLAN access point, wherein the WLAN access point communicates with the coordination manager via the internet.

10. The wireless device of claim 1, wherein the controller is configured to (i) monitor, using the time information from the first base station, a length of time the WLAN transceiver is in the power save mode, and (ii) control the WLAN transceiver to exit the power save mode in response to the length of time reaching a predetermined value corresponding to the sleep period.

11. The wireless device of claim 10, wherein the controller is configured to determine the predetermined value in cooperation with the second wireless device.

12. A method of operating a wireless device, the method comprising:
- selectively transitioning a wireless local area network (WLAN) transceiver of the wireless device between operating in a power save mode and operating in a full power mode;
- wirelessly communicating with a second wireless device while the WLAN transceiver is operating in the full power mode;
- using a mobile phone radio transceiver of the wireless device, receiving time information from a first base station in accordance with a mobile phone protocol, wherein the time information is based on a time reference maintained by the first base station;
- determining expiration of a sleep period based on
  (i) the time information from the first base station, and
  (ii) an offset between the time reference maintained by the first base station and a second time reference maintained by a second base station; and
- instructing the WLAN transceiver to transition to the full power mode upon expiration of the sleep period.

13. The method of claim 12, further comprising receiving and storing time reference settings common to a group that includes the wireless device and the second wireless device.

14. The method of claim 13, further comprising requesting participation of the wireless device in the group.

15. The method of claim 14, further comprising communicating with a coordination manager to request participation of the wireless device in the group.

16. The method of claim 15, further comprising receiving, from the coordination manager, information specifying the first base station from which the mobile phone radio transceiver is to receive the time information.

17. The method of claim 15, further comprising receiving, from the coordination manager, information specifying a wireless channel for the WLAN transceiver to use in communicating with the second wireless device.

18. The method of claim 15, further comprising receiving, from the coordination manager, information specifying the offset between the time reference maintained by the first base station and the second time reference maintained by the second base station.

19. The method of claim 15, further comprising communicating with the coordination manager, using the WLAN transceiver, via a WLAN access point, wherein the WLAN access point communicates with the coordination manager via the internet.

20. The method of claim 12, further comprising
- monitoring, using the time information from the first base station, a length of time the WLAN transceiver is in the power save mode; and
- controlling the WLAN transceiver to exit the power save mode in response to the length of time reaching a predetermined value corresponding to the sleep period.

21. The method of claim 20, further comprising determining the predetermined value in cooperation with the second wireless device.

* * * * *